(12) United States Patent
Yoshimura

(10) Patent No.: US 10,979,631 B2
(45) Date of Patent: Apr. 13, 2021

(54) IMAGE PROCESSING SYSTEM, APPARATUS, AND CONTROL METHOD

(71) Applicant: CANON KABUSHIKI KAISHA, Tokyo (JP)

(72) Inventor: Yuri Yoshimura, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 26 days.

(21) Appl. No.: 15/972,672

(22) Filed: May 7, 2018

(65) Prior Publication Data

US 2018/0332218 A1 Nov. 15, 2018

(30) Foreign Application Priority Data

May 12, 2017 (JP) .............................. JP2017-095842

(51) Int. Cl.
*H04N 5/232* (2006.01)
*H04N 5/04* (2006.01)
*H04N 5/247* (2006.01)

(52) U.S. Cl.
CPC ......... *H04N 5/23232* (2013.01); *H04N 5/247* (2013.01); *H04N 5/04* (2013.01)

(58) Field of Classification Search
CPC ...... B64D 2033/022; B64D 2033/0286; B64D 33/02; G06K 9/00711; G06K 9/00771;
(Continued)

(56) References Cited

U.S. PATENT DOCUMENTS 6,269,483 B1 * 7/2001 Broussard .............. H04N 7/148
348/14.12
6,608,941 B1 * 8/2003 Suzuki ................... H04N 1/409
358/3.01
(Continued)

FOREIGN PATENT DOCUMENTS

JP 2004200989 A 7/2004
JP 2006148327 A 6/2006
(Continued)

OTHER PUBLICATIONS

Combined Search and Examination Report issued in GB Application No. 1807660.4 dated Feb. 1, 2019.
(Continued)

*Primary Examiner* — Joseph G Ustaris
*Assistant Examiner* — Kehinde Abimbola
(74) *Attorney, Agent, or Firm* — Rossi, Kimms & McDowell LLP

(57) ABSTRACT

An image processing apparatus for controlling at least one, of a plurality of image capture apparatuses, the plurality of image capture apparatuses arranged to capture a plurality of images for generating a virtual viewpoint image, the image processing apparatus comprising: a determination unit configured to determine a region of interest in at least one image captured by the at least one image capture apparatus; and a control unit configured to control, if based on the determined region of interest it is determined to adjust an image quality of another image to be captured by the at least one image capture apparatus, the at least one image capture apparatus so that the image quality of the other image to be captured thereby is adjusted.

20 Claims, 10 Drawing Sheets

(58) Field of Classification Search
CPC ............ G06K 9/00; G06T 2207/10016; G06T 2207/30232; G06T 7/20; G06T 11/006; G06T 15/205; G06T 7/0012; G06T 7/11; G06T 2207/10024; G06T 2207/30196; G06T 2207/20021; G06T 7/0016; G06T 7/248; G06T 7/215; G06T 7/246; H04N 5/247; H04N 13/111; H04N 5/232; H04N 13/296; H04N 13/243; H04N 7/181; H04N 13/117; H04N 13/161; H04N 13/282; H04N 13/128; H04N 13/189; H04N 5/04; H04N 5/23232
See application file for complete search history.

(56) References Cited

U.S. PATENT DOCUMENTS

| | | | | |
|---|---|---|---|---|
| 7,096,028 | B2* | 8/2006 | Taketsugu | H04W 28/20 370/335 |
| 7,914,468 | B2* | 3/2011 | Shalon | A61B 5/0006 600/590 |
| 7,957,581 | B2* | 6/2011 | Wu | G06T 7/593 348/187 |
| 8,886,634 | B2* | 11/2014 | Yoshio | G08B 13/19613 707/722 |
| 8,964,998 | B1* | 2/2015 | McClain | H03G 3/32 381/106 |
| 10,055,543 | B2* | 8/2018 | Kozuka | G06F 16/50 |
| 10,068,373 | B2* | 9/2018 | Lee | G06F 3/04815 |
| 10,261,747 | B2* | 4/2019 | Troy | G06F 3/147 |
| 10,599,390 | B1* | 3/2020 | Brahmbhatt | G06F 3/0482 |
| 2002/0119755 | A1* | 8/2002 | Taketsugu | H04W 28/20 455/67.13 |
| 2005/0129325 | A1* | 6/2005 | Wu | G06T 7/593 382/254 |
| 2006/0064037 | A1* | 3/2006 | Shalon | A61B 5/1112 600/586 |
| 2006/0065844 | A1* | 3/2006 | Zelakiewicz | G01N 23/04 250/370.09 |
| 2006/0120285 | A1* | 6/2006 | Pathak | H04W 4/24 370/230 |
| 2008/0143823 | A1* | 6/2008 | Jin | G03H 1/0005 348/44 |
| 2009/0104990 | A1* | 4/2009 | Tsujino | A63F 13/04 463/32 |
| 2009/0128548 | A1 | 5/2009 | Gloudemans et al. | |
| 2010/0141991 | A1* | 6/2010 | Yoshida | H04N 1/3878 358/1.15 |
| 2010/0240992 | A1* | 9/2010 | Hao | A61B 8/00 600/437 |
| 2011/0074970 | A1* | 3/2011 | Sukegawa | G06K 9/00261 348/222.1 |
| 2011/0122229 | A1* | 5/2011 | Cinquin | A61B 1/00193 348/47 |
| 2012/0274754 | A1* | 11/2012 | Tsuruoka | A61B 1/00009 348/65 |
| 2013/0272548 | A1* | 10/2013 | Visser | G06K 9/00624 381/122 |
| 2014/0177915 | A1* | 6/2014 | Fan | G06T 7/74 382/103 |
| 2015/0046676 | A1* | 2/2015 | Archibald | G06F 9/5083 712/28 |
| 2015/0189235 | A1* | 7/2015 | Oike | H04L 65/604 348/14.07 |
| 2015/0189236 | A1* | 7/2015 | Oike | H04N 7/152 348/14.07 |
| 2015/0317452 | A1* | 11/2015 | Kozuka | G06F 16/5866 705/2 |
| 2015/0356271 | A1* | 12/2015 | Kozuka | G06F 16/5838 705/2 |
| 2016/0005229 | A1* | 1/2016 | Lee | G06F 3/0488 345/419 |
| 2016/0140421 | A1* | 5/2016 | Edpalm | H04N 19/172 382/220 |
| 2016/0220169 | A1* | 8/2016 | Girouard | A61B 5/0402 |
| 2017/0091930 | A1* | 3/2017 | Kozuka | G06F 19/321 |
| 2017/0262606 | A1* | 9/2017 | Abdullah | G06F 19/3418 |
| 2017/0293413 | A1* | 10/2017 | Matsushita | G06T 15/205 |
| 2017/0347133 | A1* | 11/2017 | Wang | H04N 5/23206 |
| 2018/0075657 | A1* | 3/2018 | Lanier | G06T 19/006 |
| 2018/0075658 | A1* | 3/2018 | Lanier | G06T 19/006 |
| 2018/0109872 | A1* | 4/2018 | Chavez | H04R 27/00 |
| 2018/0139377 | A1* | 5/2018 | Zhang | G06T 7/0012 |
| 2018/0157455 | A1* | 6/2018 | Troy | G06F 3/147 |
| 2018/0167553 | A1* | 6/2018 | Yee | H04N 5/23222 |
| 2019/0230282 | A1* | 7/2019 | Sypitkowski | H04N 5/23238 |

FOREIGN PATENT DOCUMENTS

| | | |
|---|---|---|
| JP | 2012060531 A | 3/2012 |
| JP | 2012222780 A | 11/2012 |
| JP | 2015204512 A | 11/2015 |
| WO | 2008035745 A1 | 3/2008 |

OTHER PUBLICATIONS

Office Action issued in Japanese Appln. No. 2017-095842 dated Feb. 19, 2021.

* cited by examiner

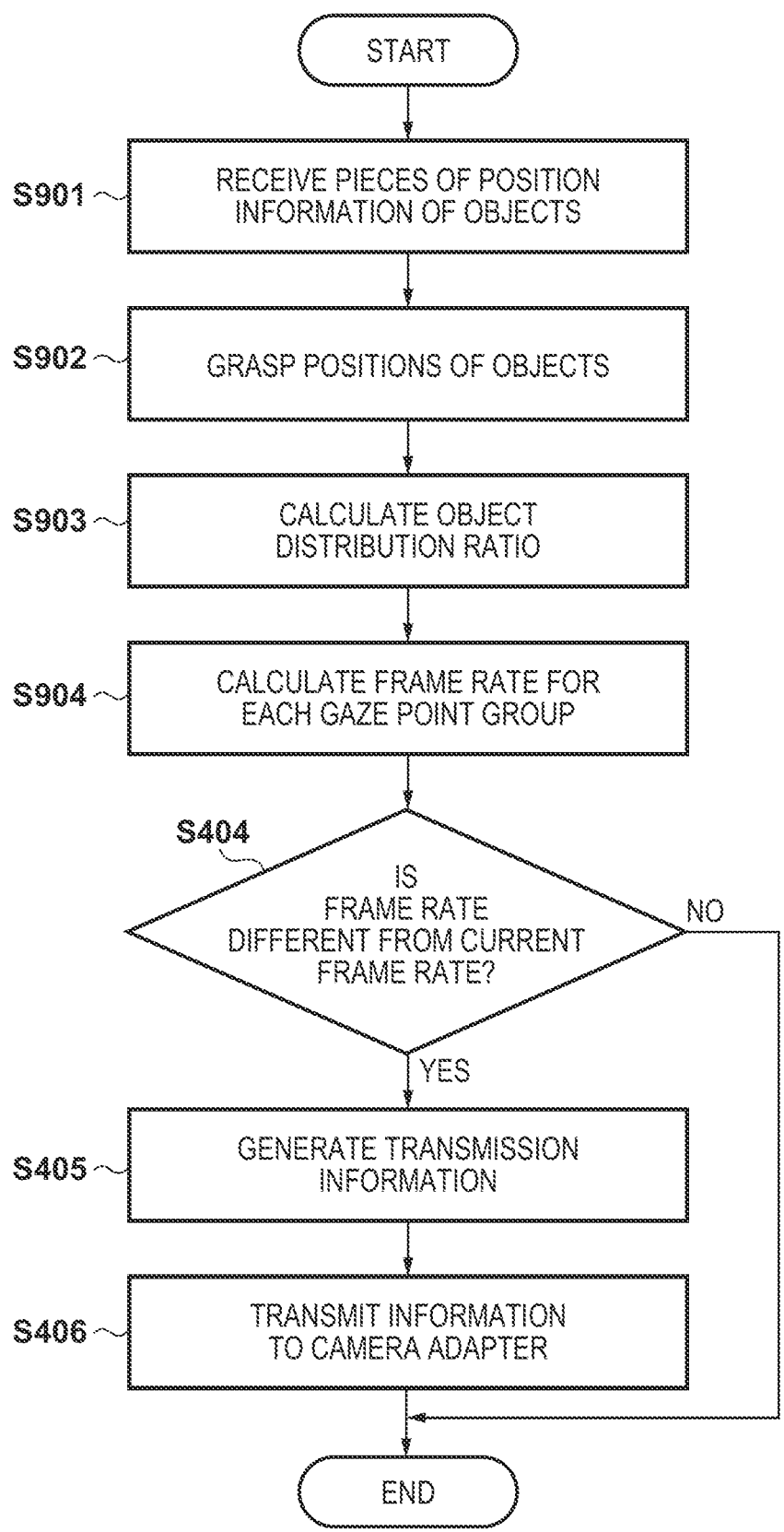

IMAGE PROCESSING SYSTEM, APPARATUS, AND CONTROL METHOD

BACKGROUND OF THE INVENTION

Field of the Invention

The present invention relates to an image processing apparatus or an image processing system that includes a plurality of cameras to capture an object from a plurality of positions.

Description of the Related Art

In recent years, a technique of performing synchronized or synchronous capturing of a plurality of multi-viewpoint images using a plurality of cameras placed at different positions and generating a virtual viewpoint content using the plurality of viewpoint images obtained by the capturing has received attention. Using this technique of generating the virtual viewpoint content (a content with a virtual or a variable viewpoint) from the plurality of viewpoint images (i.e. images taken from a plurality of different positions or viewpoints), for example, highlight scenes of a soccer or basketball game can be captured and viewed from various angles. This can give a user a more natural or realistic feeling compared to single-viewpoint images. Generation and browsing of the virtual viewpoint content based on the plurality of viewpoint images can be implemented by collecting images captured by the plurality of cameras at an image processing unit, such as a server, and causing the image processing unit to execute processing such as 3D model generation and rendering and transmit the processed images to a user terminal.

Japanese Patent Laid-Open No. 2004-200989 (to be referred to as a literature 1 hereinafter) discloses a technique of detecting a motion of an object to be captured, and adjusting a capture frame rate (i.e. a frame rate at which the object is captured) and a display resolution of the displayed image in accordance with the detected motion of the object to be captured.

When browsing a virtual viewpoint content including, for example a highlight scene/clip such as a goal scoring scene/clip, a finer image (i.e. an image with more detail and/or an image in a higher resolution) of a specific area such as an area around the goal, the ball or a player who scored the goal may be desired. When generating a finer virtual viewpoint content of the specific area, a captured image of a camera for capturing the specific area needs to capture an image with high image quality. However, as described in literature 1, if an arrangement for simply increasing/decreasing the image quality in accordance with a motion of an object to be captured is applied to an image processing system including a plurality of cameras, the image qualities of the plurality of cameras are all uniformly changed. Therefore, if the motion is large, the image qualities of the plurality of cameras are all uniformly increased, and an image processing server may then be overloaded. To the contrary, if the motion is small, the image qualities of the plurality of cameras are all uniformly decreased, the throughput of the server is partially left unused, and the image quality may unnecessarily be lower.

SUMMARY OF THE INVENTION

According to an embodiment of the present invention, an image processing system or an image processing apparatus for generating a virtual viewpoint image based on captured images from a plurality of cameras can provide higher image quality for an area.

According to one aspect of the present invention, there is provided an image processing apparatus for controlling at least one of a plurality of image capture apparatuses, the plurality of image capture apparatuses arranged to capture a plurality of images for generating a virtual viewpoint image, the image processing apparatus comprising: a determination unit configured to determine a region of interest in at least one image captured by the at least one image capture apparatus; and a control unit configured to control, if based on the determined region of interest it is determined to adjust an image quality of another image to be captured by the at least one image capture apparatus, the at least one image capture apparatus so that the image quality of the other image to be captured thereby is adjusted.

According to another aspect of the present invention, there is provided an image processing system comprising: a plurality of image capture apparatuses arranged to capture a plurality of images for generating a virtual viewpoint image; and the above-described image processing apparatuses, wherein the image processing apparatus is configured to receive and process at least one image from at least one, but not all, of a plurality of image capture apparatuses.

According to another aspect of the present invention, there is provided an image processing system comprising: a plurality of image capture apparatuses arranged to capture a plurality of images for generating a virtual viewpoint image; a generation apparatus configured to generate the virtual viewpoint image from the captured plurality of images; and a control apparatus comprising: a determination unit configured to determine a transmission data amount for each image capture apparatus by assigning, to the plurality of image capture apparatuses, proportions of a total data amount that can be transmitted from the plurality of image capture apparatuses to the generation apparatus; and a control unit configured to generate control data for capture setting and/or transmission setting for each of the plurality of image capture apparatuses based on the transmission data amount determined by the determination unit.

According to another aspect of the present invention, there is provided a method of controlling an image processing apparatus for controlling at least one of a plurality of image capture apparatuses, the plurality of image capture apparatuses arranged to capture a plurality of images for generating a virtual viewpoint image, the method comprising: determining a region of interest in at least one image captured by the at least one image capture apparatus; and controlling, if based on the determined region of interest it is determined to adjust an image quality of another image to be captured by the at least one image capture apparatus, the at least one image capture apparatus so that the image quality of the other image to be captured thereby is adjusted.

According to another aspect of the present invention, there is provided a non-transitory computer readable storage medium storing a computer program that, when executed by an image processing apparatus, causes the image processing apparatus to perform a method comprising: determining a region of interest in at least one image captured by the at least one image capture apparatus; and controlling, if based on the determined region of interest it is determined to adjust an image quality of another image to be captured by the at least one image capture apparatus, the at least one image capture apparatus so that the image quality of the other image to be captured thereby is adjusted.

Further features, aspects, and advantages of the present invention will become apparent from the following description of embodiments (with reference to the attached drawings). Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 10 is a flowchart illustrating frame rate adjustment processing according to the third embodiment.

DESCRIPTION OF THE EMBODIMENTS

Embodiments of the present invention will be described in detail below with reference to the accompanying drawings.

First Embodiment

Image Processing System

Figure 1:
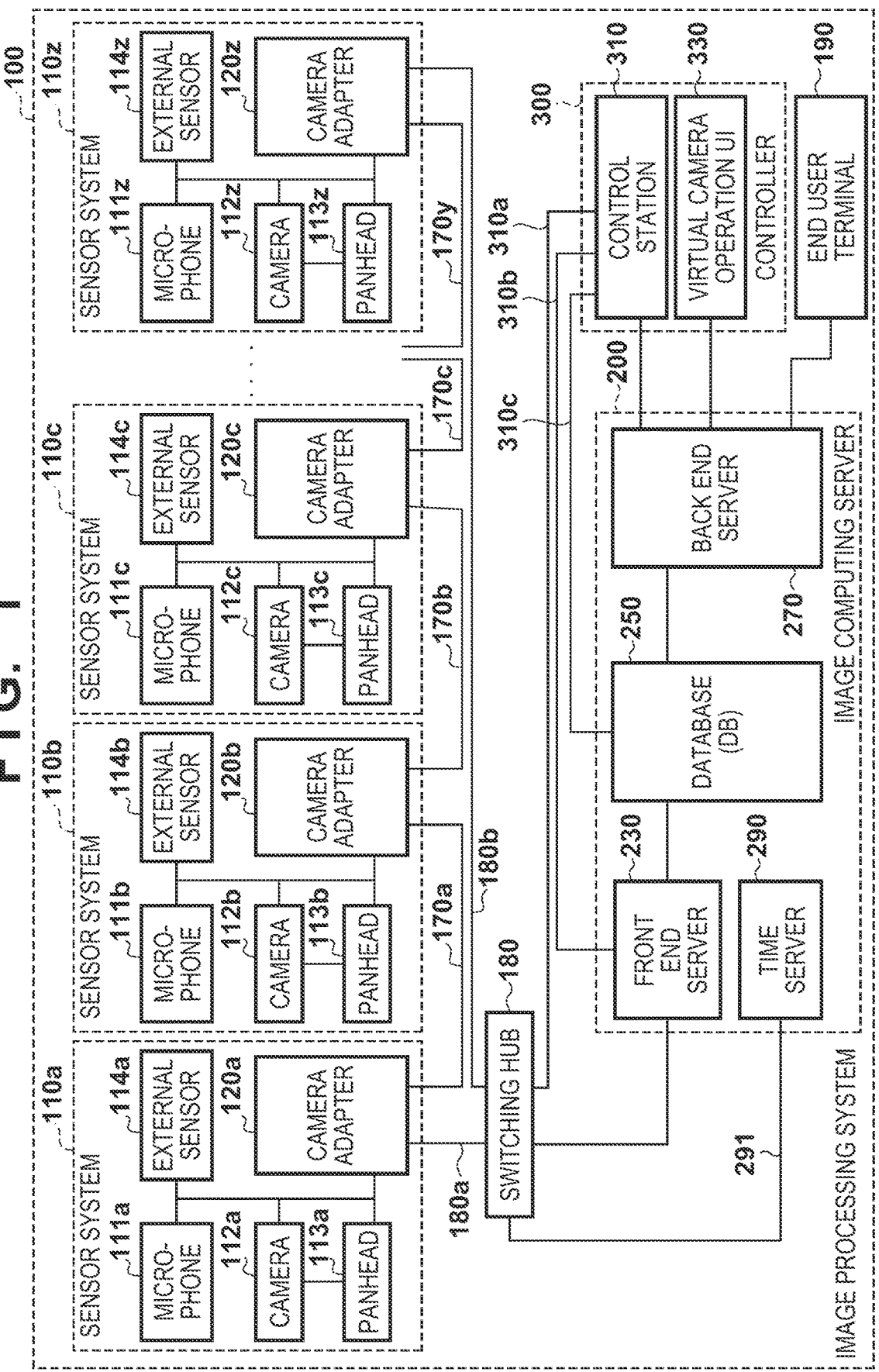
FIG. 1 is a block diagram showing an example of the arrangement of an image processing system.

An image processing system according to an embodiment that performs image capturing and sound collection (recording) using a plurality of cameras and microphones placed in a location or a facility such as an arena (stadium) or a concert hall will be described with reference to the block diagram of FIG. 1 showing a system arrangement. It is understood that according to another embodiment of the invention, the same image processing system may be used in any location as long as the system comprises at least one sensor for capturing an image or collecting/recording sound (e.g. at least one image capturing apparatus and, optionally, at least one sound collecting/recording apparatus). An image processing system 100 includes sensor systems 110a to 110z, an image computing server 200, a controller 300, a switching hub 180, and an end user terminal 190.

The controller 300 includes a control station 310 and a virtual camera operation UI (User Interface) 330. The control station 310 performs management of operation states and parameter setting control for the respective blocks forming the image processing system 100 via networks 310a to 310c, 180a, 180b, and 170a to 170y. Each network may be GbE (Gigabit Ethernet) or 10 GbE, which is Ethernet® complying with the IEEE standard, or may be formed by combining interconnect Infiniband, industrial Ethernet, and the like. The network is not limited to these, and may be a network of another type capable of enabling communication.

An operation of transmitting 26 sets of images and sounds obtained by the sensor systems 110a to 110z from the sensor system (e.g. 110z) to the image computing server 200 will be explained first. In the image processing system 100 according to the first embodiment, the sensor systems 110a to 110z are connected by a daisy chain.

In this embodiment, the 26 sensor systems 110a to 110z will be described as sensor systems 110 without distinction unless specifically stated otherwise. Similarly, devices in each sensor system 110 will be described as a microphone 111, a camera 112, a panhead (an orientation or position adjustment unit) 113, an external sensor 114, and a camera adapter 120 without distinction unless specifically stated otherwise. Note that in this embodiment, the number of sensor systems is 26. However, the number of sensor systems is merely an example and is not limited to this. Note that in this embodiment, a term "image" includes the concepts of both a moving image and a still image unless specifically stated otherwise. That is, the image processing system 100 according to this embodiment can process both a still image and a moving image. In this embodiment, an example in which a virtual viewpoint content provided by the image processing system 100 includes both a virtual viewpoint image and a virtual viewpoint sound will mainly be described. However, the present invention is not limited to this. For example, the virtual viewpoint content need not include a sound, i.e. according to another embodiment only images are captured and processed for the virtual viewpoint content. Additionally, for example, the sound included in the virtual viewpoint content may be a sound collected by a microphone closest to the virtual viewpoint. In this embodiment, a description of a sound will partially be omitted for the sake of descriptive simplicity. Basically, when an image and a sound are both available, they are processed together.

Each of the sensor systems 110a to 110z includes one of single camera 112a to 112z, respectively. That is, the image processing system 100 includes a plurality of cameras to capture an object from a plurality of positions (i.e. a plurality of angles, orientation or directions and optionally different distances from the object). The plurality of sensor systems 110 are connected to each other by a daisy chain. This connection form has the effect of decreasing the number of connection cables and saving labour in a wiring operation when increasing the image data capacity along with an increase in a captured image resolution to 4K or 8K and an increase in the frame rate. Note that the present invention is not limited to this. For example, as the connection form (network configuration or topology), the sensor systems 110a to 110z may be connected to the switching hub 180 to form a star network in which data transmission/reception among the sensor systems 110 is performed via the switching hub 180.

FIG. 1 shows an arrangement in which all the sensor systems 110a to 110z are cascade-connected so as to form a daisy chain. However, the present invention is not limited to this. For example, the plurality of sensor systems 110 may be divided into groups, and the sensor systems 110 may be connected by a daisy chain in each divided group. The camera adapter 120 at the end of a division unit may be connected to the switching hub to input an image to the image computing server 200. This arrangement is particularly effective in a stadium. For example, a case in which a stadium includes a plurality of floors, and the sensor system 110 being disposed (i.e. employed, positioned, located or installed) in each floor can be considered. In this case, images from the disposed sensor systems 110 can be input to the image computing server 200 in every floor or every half round of the stadium. This way, even in a place where wiring to connect all the sensor systems 110 by one daisy chain is difficult, the placement can be simplified and the system can be made versatile.

Control of image processing performed in the image computing server 200 is switched (i.e. suitably adjusted or modified) depending on whether one camera adapter 120 or two or more camera adapters 120 are connected by a daisy chain to input images to the image computing server 200. That is, the control is switched depending on whether the sensor systems 110 are divided into a plurality of groups or not. In a case in which one camera adapter 120 inputs images to the image computing server 200, an all-round image of the arena is generated while transmitting images through the daisy chain connection. Therefore, the timings that all-round image data are completely collected in the image computing server 200 are synchronized. That is, the timings of capturing the data (e.g. capturing the image or collecting/recoding the sound) are synchronized unless the sensor systems 110 are divided into groups.

However, in a case in which a plurality of camera adapters 120 input images to the image computing server 200 (the sensor systems 110 are divided into groups), the delay may change between the lanes (routes) of daisy chains. Therefore, image processing of a subsequent stage needs to be executed while checking collection/capture of data (e.g. image data or sound data) by a synchronization or a synchronous control of establishing synchronization after the all-round data are completely collected (i.e. received) in the image computing server 200.

The sensor system 110a includes a microphone 111a, the camera 112a, a panhead 113a, an external sensor 114a, and a camera adapter 120a. Note that the sensor system 110a is not limited to this. The sensor system 110a need only include at least one camera adapter 120a and one camera 112a or one microphone 111a. For example, the sensor system 110a may be formed by one camera adapter 120a and a plurality of cameras 112a, or may be formed by one camera 112a and a plurality of camera adapters 120a. That is, the plurality of cameras 112 and the plurality of camera adapters 120 in the image processing system 100 are in an N-to-M (N and M are integers of 1 or more) correspondence. The sensor system 110a may include devices other than the microphone 111a, the camera 112a, the panhead 113a, and the camera adapter 120a. The camera 112 and the camera adapter 120 may be integrated. At least some functions of the camera adapter 120 may be performed on a front end server 230. In this embodiment, the sensor systems 110b to 110z have the same arrangement as that of the sensor system 110a. However, all the sensor systems 110 need not have the same arrangement as that of the sensor system 110a, and may have different arrangements.

A sound collected by the microphone 111a and an image captured by the camera 112a undergo image processing (to be described later) by the camera adapter 120a and are then transmitted to a camera adapter 120b of the sensor system 110b via the daisy chain 170a. Similarly, the sensor system 110b collects sound and captures an image and performs image processing (by a camera adapter 120b) then transmits the processed collected sound and the processed captured image to the sensor system 110c together with the image and the sound obtained from the sensor system 110a. By continuing this operation, the images and sounds obtained by the sensor systems 110a to 110z are processed and then transmitted from the sensor system 110z to the switching hub 180 via the network 180b, and then transmitted from the switching hub 180 to the image computing server 200.

Note that in this embodiment, the camera 112 is separated from the camera adapter 120. However, the camera and the camera adapter may be integrated in a single housing. In this case, the microphone 111 may be incorporated in the integrated camera 112/camera adapter 120 housing or may be connected to the outside of the camera 112/camera adapter 120 housing.

The arrangement and operation of the image computing server 200 (e.g. an image processing server) will be described next. The image computing server 200 according to this embodiment processes data obtained from the sensor system 110z. The image computing server 200 includes the front end server (e.g. a presentation layer) 230, a database 250, a back end server (e.g. a data access layer) 270, and a time server 290.

The time server 290 has a function of distributing a time and synchronization signal, and distributes a time and synchronization signal to the sensor systems 110a to 110z via the switching hub 180. Upon receiving the time and synchronization signal, the camera adapters 120a to 120z perform image frame synchronization by genlocking (generator locking) the cameras 112a to 112z based on the time and synchronization signal. That is, the time server 290 synchronizes the capture timings of the plurality of cameras 112. This synchronization of the capture timings means the image processing system 100 can generate a virtual viewpoint image based on the plurality of images captured at the same timing, whereby a lowering of the quality of the virtual viewpoint image caused by a shift of (i.e. asynchronous) capture timings can be suppressed. Note that in this embodiment, the time server 290 manages (controls) the time synchronization of the plurality of cameras 112. However, the present invention is not limited to this, and the cameras 112 or camera adapters 120 may independently perform processing for the time synchronization.

The front end server 230 reconstructs a segmented transmission packet from images and sounds obtained from the sensor system 110z, and converts the data format. The front end server 230 writes the reconstructed data in the database 250 in accordance with a camera identifier, data type, and frame number. The back end server 270 generates a virtual viewpoint image from images captured by the plurality of cameras. More specifically, the back end server 270 accepts a viewpoint designation from the virtual camera operation UI 330, reads out corresponding image and sound data from the database 250 based on the accepted viewpoint, and performs rendering processing, thereby generating a virtual viewpoint image.

Note that the arrangement of the image computing server 200 is not limited to the above-described one. For example, at least two of the front end server 230, the database 250, and the back end server 270 may be integrated in a single unit/housing. In addition, at least one of the front end server 230, the database 250, and the back end server 270 may include a plurality of devices. A device other than the above-described devices may be included at an arbitrary position in the image computing server 200. Furthermore, at least some of the functions of the image computing server 200 may be performed on the end user terminal 190 and/or the virtual camera operation UI 330.

The rendered virtual viewpoint image is transmitted from the back end server 270 to the end user terminal 190, and displayed. The user who operates the end user terminal 190 can browse different images and listen to the sound according to the viewpoint designation. As described above, the back end server 270 generates a virtual viewpoint content based on the images (the plurality of viewpoint images) captured by the plurality of cameras 112 and viewpoint information. More specifically, the back end server 270 generates a virtual viewpoint content based on image data of a predetermined region (to be described later) extracted by the plurality of camera adapters 120 from the images captured by the plurality of cameras 112, and the viewpoint designated by the user operation (e.g. a user input). Then, the back end server 270 provides the generated virtual viewpoint content to the end user terminal 190. Extraction (e.g. detection/determination) of the predetermined region by the camera adapter 120 will be described in detail later.

The virtual viewpoint content according to this embodiment is a content including a virtual viewpoint image as an image obtained when an object is captured from a virtual viewpoint. In other words, the virtual viewpoint image can be said to be an image representing a sight (i.e. a view) from a designated viewpoint (i.e. a designated or selected position). The virtual viewpoint may be designated by the user or may automatically be designated based on a result of image analysis or the like. That is, examples of a virtual viewpoint image include: an arbitrary viewpoint image corresponding to a viewpoint arbitrarily designated by the user, an image corresponding to a viewpoint designated by the user from a plurality of candidates, or an image corresponding to a viewpoint automatically designated by the device.

Note that in this embodiment, an example in which a virtual viewpoint content includes sound data (audio data) will mainly be described. However, sound data need not always be included.

The back end server 270 (encodes or compresses) the virtual viewpoint image using a standard technique such as H.264 or HEW and then transmits the encoded/compressed virtual viewpoint image to the end user terminal 190 using a streaming technique such as the MPEG-DASH protocol. Alternatively, the back end server 270 transmits the virtual viewpoint image to the end user terminal 190 without the compressing, i.e. in a non-compressed (i.e. uncompressed) state. For example, the end user terminal 190 is a smartphone or a tablet in the former case in which the encoding/compression is performed, and the end user terminal 190 is a display capable of displaying a non-compressed image in the latter case of not performing the encoding/compression. The back end server 270 can switch (i.e. adjust or change) the image format (and whether to use encoding/compression) in accordance with the type of the end user terminal 190. The image transmission protocol is not limited to MPEG-DASH. For example, HLS (HTTP Live Streaming) or any other transmission method is usable.

As described above, the image processing system 100 includes three functional domains, that is, an image collection domain (or image capture domain), a data storage domain, and an image generation domain. That is, the image collection domain includes functions served by the sensor systems 110a to 110z. The data storage domain includes functions served by the database 250, the front end server 230, and the back end server 270. The image generation domain includes functions served by the virtual camera operation UI 330, the end user terminal 190, and the back end server 270.

Note that the functional domain arrangement is not limited to this. For example, the virtual camera operation UI 330 can also directly obtain images from the sensor systems 110a to 110z. In this embodiment, however, not the method of directly obtaining images from the sensor systems 110a to 110z but the method of arranging the data storage function midway is employed. More specifically, the front end server 230 converts image data and, if also collected/included, sound data generated by the sensor systems 110a to 110z and meta information of these data into a common schema and data type of the database 250. Accordingly, even if the cameras 112 of the sensor systems 110a to 110z are changed to cameras of another model, any differences from this camera change can be compensated at the front end server 230, and the data can be registered in the database 250. This can reduce the fear that the virtual camera operation UI 330 does not appropriately operate in a case in which the cameras 112 are changed to cameras of another model.

In addition, the virtual camera operation UI 330 is configured to access the database 250 not directly but via the back end server 270. Common processing associated with image generation processing is performed by the back end server 270, and the different portion (i.e. uncommon processing associated with image generation processing) of the application associated with the operation UI is performed by the virtual camera operation UI 330. Hence, when developing the virtual camera operation UI 330, a developer can concentrate on developing a UI operation device or functional requirements of a UI that operates a virtual viewpoint image to be generated. In addition, the back end server 270 can also add or delete common processing associated with image generation processing in accordance with a request of the virtual camera operation UI 330. This makes it possible to flexibly cope with a request of the virtual camera operation UI 330.

In the image processing system 100, the back end server 270 thus generates a virtual viewpoint image based on image data based on capturing by the plurality of cameras 112 configured to capture an image of an object from the plurality of directions/positions. Note that the image processing system 100 according to this embodiment is not limited to the above-described physical arrangement (topology) and may have a logical arrangement (a different topology) as long as the system is capable of capturing images (and collect sound if capable) from a plurality of directions/positions, and process the captured images (and collected sound if capable) to generate a virtual view point image.

Camera Adapter

Figure 2:
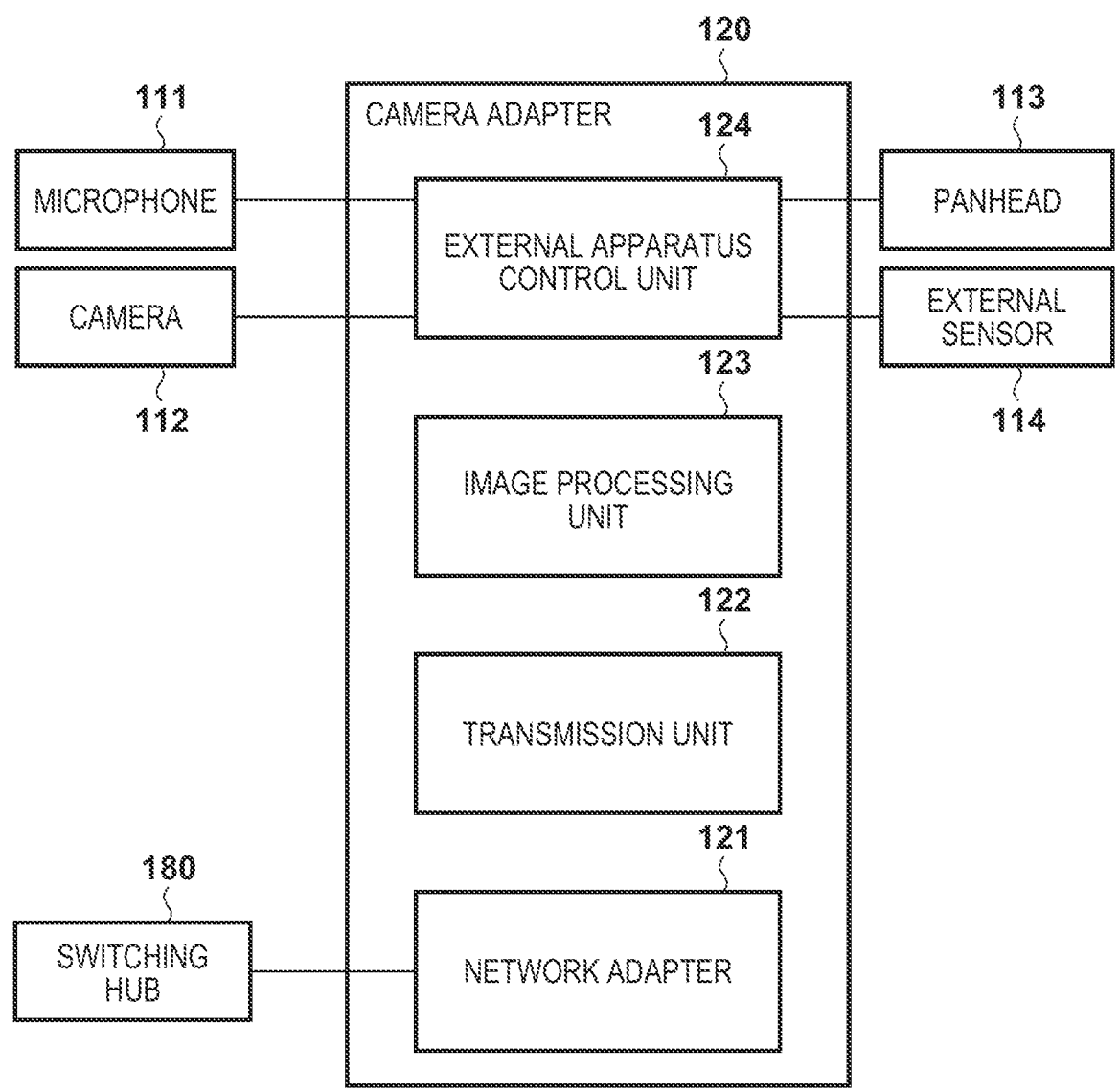
FIG. 2 is a block diagram showing an example of a functional arrangement of a camera adapter.

The functional blocks of the camera adapter (an image processing apparatus) 120 according to this embodiment will be described with reference to FIG. 2. The camera adapter 120 includes a network adapter 121, a transmission unit 122, an image processing unit 123, and an external apparatus control unit 124.

The network adapter 121 performs time synchronization with another camera adapter 120, the front end server 230, the time server 290, and the control station 310 via the daisy chain 170, a network 291, and the network 310a, thereby it executes/performs data communication.

The transmission unit 122 has a function of controlling data transmission to the switching hub 180 or the like via the network adapter 121. More specifically, the transmission unit 122 has: a function of performing a predetermined compression (encoding)/decompression (decoding) for data to be transmitted/received via the network adapter 121, a function of determining routing of transmission data and executing the transmission, and a function of creating a message to be added to the data to be transmitted/received to/from the other camera adapter 120, the front end server 230, and the control station 310 or a function of executing predetermined processing based on a received message.

For example, the received message includes image data or sound data and meta information of that data. The meta information according to this embodiment includes a time code (i.e. a timestamp) or sequence number obtained when capturing an image or sampling/collecting a sound (i.e. time data indicating when an image was captured or a sound was collected/sampled), a data type, and an identifier identifying each individual camera 112 or microphone 111.

The image processing unit 123 has a function of processing image data captured by the camera 112 and image data received from the other camera adapter 120 under the control of the external apparatus control unit 124. The aforementioned extraction (e.g. detection/determination) of the predetermined region by the camera adapter 120 as one of the image processing processes will be described in detail.

The image processing unit 123 has a function of setting, as a foreground image, an image obtained as a result of an object detection from an image captured by the camera 112, and thus separating the captured image into the foreground image (with the detected object captured therein) and a background image. The predetermined region is, for example, the foreground image obtained as a result of the object detection in the captured image. Note that the object is, for example, a person or any object of interest. The object may be a specific person (a player, a coach, and/or a referee) or an object such as a ball or goal with a predetermined image pattern. A moving body may be detected as the object as well.

When a foreground image including an important object (e.g. an object of interest) such as a person and a background image that does not include such an object are separated (i.e. determined/detected/distinguished) and processed, the quality of an image portion in the image, the image portion corresponding to the important object in a virtual viewpoint image generated by the image processing system 100 (e.g. the foreground image), can be adjusted (e.g. improved) individually. In addition, when the separation of the foreground image and the background image is performed by each of the plurality of camera adapters 120, the work load for this separation in the image processing system 100 including the plurality of cameras 112 can be distributed. Note that the predetermined region (i.e. the predetermined region to have its image quality adjusted) is not limited to the foreground image, and may be, for example, the background image. The image processing unit 123 has a function of calculating a foreground occupancy (i.e. a ratio of foreground image area to background image area) in the captured image (an image before the separation into the foreground image and the background image). The image processing unit 123 also has a function of recognizing (i.e. determining/counting) the number of the important objects from an image. Furthermore, the image processing unit 123 has a function of recognizing (i.e. identifying) one specific object from the captured image.

In addition, using the foreground image separated by the above-described image processing (i.e. the separation process) and a foreground image received from the other camera adapter 120, the image processing unit 123 has, for example, a function of generating image information concerning a 3D model (e.g. depth data) using the principle of a stereo camera, and a function of performing various calibrations or adjustments necessary for the image processing.

The external apparatus control unit 124 has a function of controlling an apparatus connected to the camera adapter 120. More specifically, the external apparatus control unit 124 has: a function of performing connection to (e.g. communicating with) the sensing system 110 (e.g. the camera 112) to, for example, control the camera 112, to obtain a captured image, provide a synchronization signal, and perform a time setting, a function of performing connection to the sensing system 110 (e.g. the microphone 111) to, for example, control the microphone 111, to start and stop sound collection, and obtain collected sound data, and a function of performing connection to the panhead 113 to, for example, control the pan/tilt of the panhead 113, and obtain a state/status information (e.g. information relating to the orientation or position) of the panhead 113.

The external apparatus control unit 124 has a function of performing connection to the external sensor 114 to obtain sensor information sensed by the external sensor 114. If, for example, a gyro sensor is used as the external sensor 114, the external apparatus control unit 124 can obtain information representing a vibration of the camera 112 and generate image data having undergone electronic anti-vibration processing. The external sensor 114 may be a temperature detection sensor, a GPS sensor, an auxiliary image sensor different from the camera 112, or the like.

Control Station 310

Figure 3:
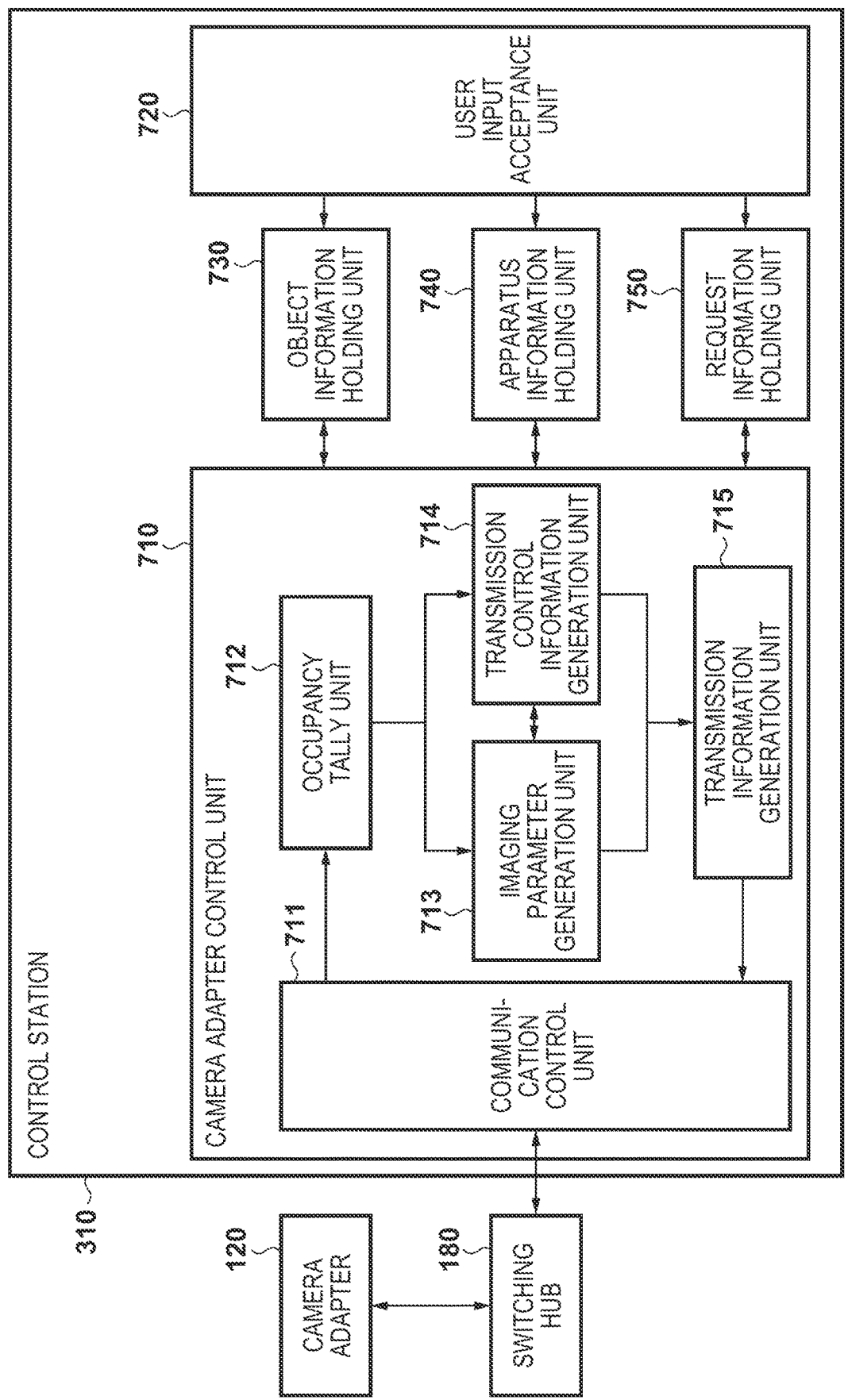
FIG. 3 is a block diagram showing an example of a functional arrangement of a control station according to the first embodiment.

The functional arrangement of the control station 310 according to this embodiment will be described with reference to FIG. 3. The control station 310 is, for example, a computer device including a CPU and a memory. Each functional unit shown in FIG. 3 can be implemented when the CPU executes a program stored in the memory. Some or all of the functional units may be implemented by dedicated hardware components. Note that FIG. 3 shows portions associated with control of imaging parameters and transmission for the camera adapter 120 among the functional blocks of the control station 310. The imaging parameters include, for example, a frame rate and a resolution of the camera 112 when capturing an image. In addition, the control station 310 has functions of controlling the front end server 230, the database 250, and the back end server 270 and holding/accessing various kinds of information necessary for the control processing. However, these functions are not illustrated in FIG. 3. A camera adapter control unit 710, a user input acceptance unit 720, an object information holding unit 730, an apparatus information holding unit 740, and a request information holding unit 750 of the control station 310 will be described below.

The functional blocks of the camera adapter control unit 710 will be described first. A communication control unit 711 receives, from the camera adapter 120 via the switching hub 180, information obtained when capturing an image. The communication control unit 711 has a function of receiving, from a transmission information generation unit 715, information to be used by the camera adapter 120 to control an external apparatus (such as the camera 112, the microphone 111, the panhead 113 or the external sensor) connected to it, and transmitting the information to the camera adapter 120.

An occupancy tally unit 712 tallies the occupancies (foreground occupancy data) of foreground images received from the plurality of camera adapters 120 in the image processing system 100. An imaging parameter generation unit 713 generates, based on the tallied occupancies, imaging parameters (for example, a frame rate, a resolution, and the like) necessary for the camera adapter 120 to control the camera 112 connected to it. A transmission control information generation unit 714 generates, based on the tallied occupancies, transmission control information (for example, a transmission compression rate and the like) necessary for the camera adapter 120 to control the transmission. The transmission information generation unit 715 receives the pieces of information generated by the imaging parameter generation unit 713 and the transmission control information generation unit 714, and determines whether it is necessary to change/adjust the control for each camera adapter 120. Then, the transmission information generation unit 715 generates transmission information (i.e. information to be transmitted such as imaging parameters and information for a transmission/communication such as transmission control information) for transmission to the camera adapter 120 for which it is determined that it is necessary to change the control thereof (e.g. through changed imaging parameters or transmission control information). The camera adapter control unit 710 controls capture setting of the camera 112 and transmission setting of the transmission unit 122 by transmitting the transmission information to the necessary camera adapter 120 via the communication control unit 711.

The user input acceptance unit 720 has a function of accepting a user input relating to information on an object to be captured, apparatus information, and/or capture operation request information, which may be necessary for capturing an image including the object. The information of the object to be captured, the apparatus information, and/or the capture operation request information, which have been accepted by the user input acceptance unit 720, are held in the object information holding unit 730, the apparatus information holding unit 740, and the request information holding unit 750, respectively. The object information holding unit 730, the apparatus information holding unit 740, and the request information holding unit 750 communicate with functional blocks (not shown) for controlling the camera adapter control unit 710, the front end server 230, the database 250, and the back end server 270, as needed.

According to an embodiment, the information of the object to be captured is a shape and an arrangement information concerning a person, an object, a facility, a sound source, and an illumination in a capture range (i.e. a range of view to be included in the captured image). The apparatus information indicates information relating to a model name, specifications, characteristic values, and/or arrangement/configuration, which concerns an image capturing apparatus such as a camera, panhead, lens, and microphone, an information apparatus such as a LAN, PC, server, and cable, and a relay vehicle. The capture operation request information is request information concerning the control values and control methods for various apparatuses requested by the user in advance to or during the capturing of an image. However, all the pieces of information needed may not always be input. These pieces of information may be automatically obtained independently of the user input (for example from a memory or a server via a network).

Adjustment of Imaging Parameters and Transmission in Camera Adapter Control Unit 710

Figure 4:
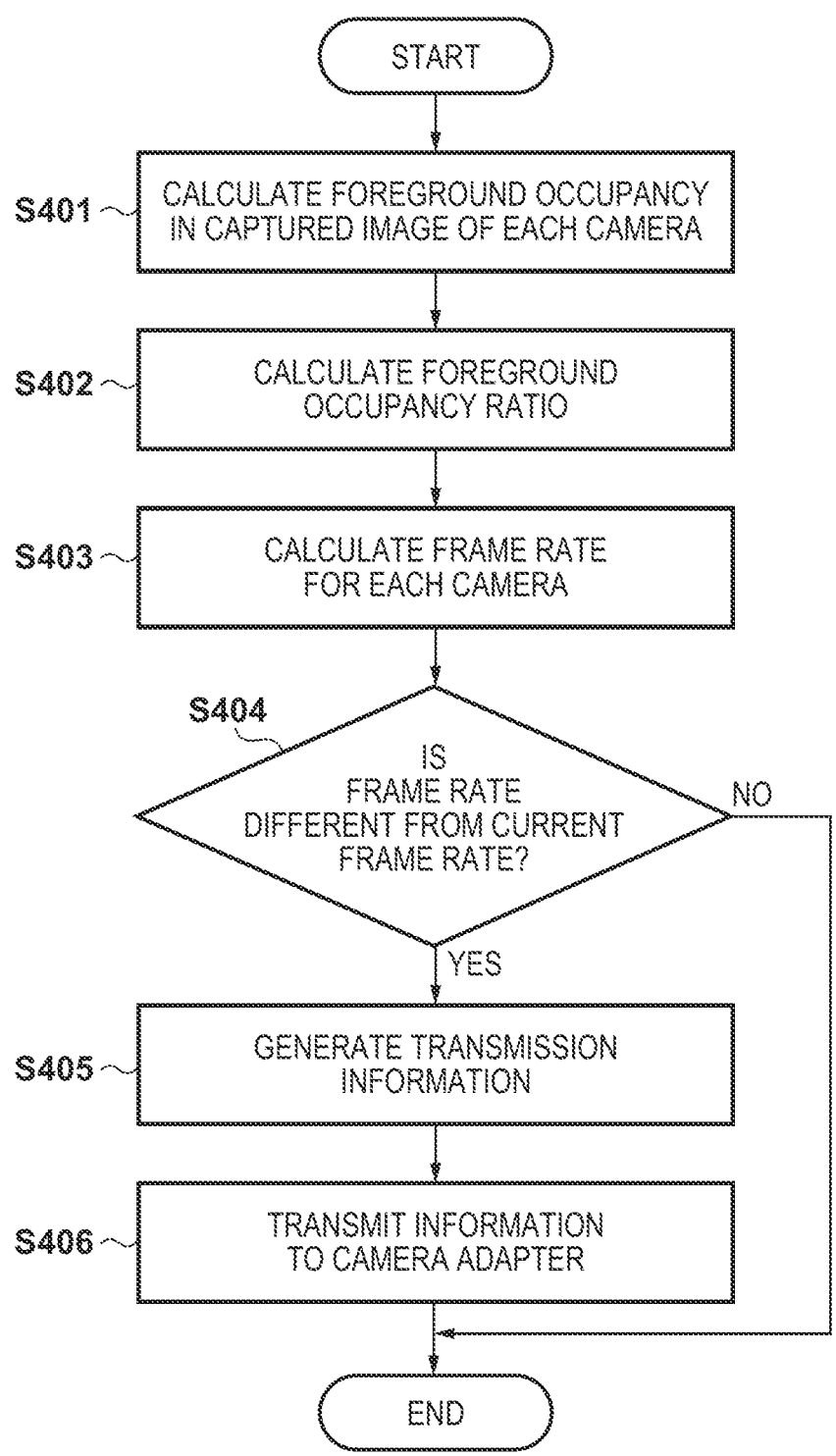
FIG. 4 is a flowchart illustrating frame rate adjustment processing according to the first embodiment.

In this embodiment, processing of the camera adapter control unit 710 from tallying of foreground occupancies to the transmission of transmission information will be described below with reference to a flowchart shown in FIG. 4. In this embodiment, the control station 310 distributes, based on foreground occupancies, to the plurality of cameras, a total data amount transmitted from the plurality of cameras to the image computing server 200 that generates a virtual viewpoint image, thereby determining the transmission data amount of each camera. Since the data amount is distributed to the plurality of cameras based on the foreground occupancies, the transmission data amounts of the cameras may become nonuniform. The control station 310 controls capture setting and/or transmission setting of each of the plurality of cameras based on the determined transmission data amount. This embodiment will describe an example of controlling a transmission data amount based on the frame rate. The example will be described in more detail below.

The camera adapter 120 calculates a foreground occupancy, that is, the pixel occupancy of a foreground image in an image (i.e. a ratio of foreground image area to background image area in the image) before the separation of the image obtained by the camera 112 (step S401). At this time, the occupancy of, especially, only an object of interest such as a player or ball in the foreground image may be calculated.

The occupancy tally unit 712 receives foreground occupancies from all the camera adapters 120 in the image processing system 100, and tallies them to calculate the foreground occupancy ratio among the plurality of cameras 112 (step S402). Based on the calculated foreground occupancy ratio, the imaging parameter generation unit 713 calculates a subsequent capture frame rate for each camera (step S403). More specifically, a higher frame rate is determined for a camera having a higher foreground occupancy ratio. However, the frame rate of each camera is determined (and assigned to each camera) so that an image data amount collected in the image computing server 200 via all daisy chains is equal to or smaller than a maximum data amount processable by the image computing server 200, and preferably as near as possible to the maximum data amount.

For example, assume that the total number of cameras is three, that is, the cameras 112a to 112c, and their foreground occupancy ratio is A:B:C. At this time, a standard frame rate Fa of the camera 112a is obtained by:

$$Fa = (D \times A/(A+B+C))/Ea \quad (1)$$

where D represents an allowable maximum data amount per second in the image computing server 200, and Ea represents a data amount (resolution) per frame of the camera 112a. Assume that Fa represents a standard value, and a frame rate Fa' actually assigned to the camera 112a is an integer value that is equal to or smaller than the standard value Fa and is controllable and settable in the camera 112a.

At this time, a controllable and settable value of the camera 112a that is held in the apparatus information holding unit 740 is referred to. If Fa≠Fa', the camera 112a leaves an actually usable data amount of (Fa−Fa')×Ea. When calculating the frame rate of another camera 112b or 112c, (Fa−Fa')×Ea can be added. Therefore, if the frame rate of the camera having a lower foreground occupancy is preferentially calculated, it is possible to assign an even higher frame rate to a camera having a higher foreground occupancy. Alternatively, by providing the lower limit value of a frame rate, and preferentially assigning a frame rate equal to or higher than the lower limit value to a camera having a lower foreground occupancy, the lowest/minimum image quality may be ensured.

The transmission information generation unit 715 confirms whether the thus determined frame rate is different from the current frame rate of the camera 112 (step S404). If the frame rate is different from the current value, the transmission information generation unit 715 generates control information to be transmitted to the corresponding camera adapter 120 (step S405), and transmits it to the corresponding camera adapter 120 (step S406). That is, among the plurality of cameras, only a camera in which a change in its capture setting and/or transmission setting needs to occur is notified of the change. Note that an example of changing the setting of the frame rate has been explained above. However, the present invention is not limited to this. For example, a setting of a resolution or a setting of a compression rate for the camera may be changed. Alternatively, a combination of two or more of the frame rate, the resolution, and the compression rate may be changed.

Note that the setting of the imaging parameters (capture settings setting process) and/or adjustment associated with transmission (transmission settings setting process) is performed for each camera 112. However, the present invention is not limited to this. The plurality of cameras 112 may be divided into camera groups each including one or more cameras, and capture setting and/or adjustment associated with transmission may be performed for each camera group. For example, if a plurality of gaze point groups exist in the image processing system 100, imaging parameters and adjustment associated with transmission may be adjusted for each gaze point group. Each gaze point group indicates a camera group including one or more cameras 112 placed so that optical axes face the same gaze point, that is, a camera group including cameras having a common gaze point among the plurality of cameras. Note that each gaze point group may indicate a camera group including one or more cameras 112 placed so that the optical axes face the same region (i.e. their lines of sight for capturing images meet in the same region/position). Alternatively, each gaze point group may indicate a camera group including one or more cameras 112 set with capture ranges so that common region can be captured by them.

Figure 5:
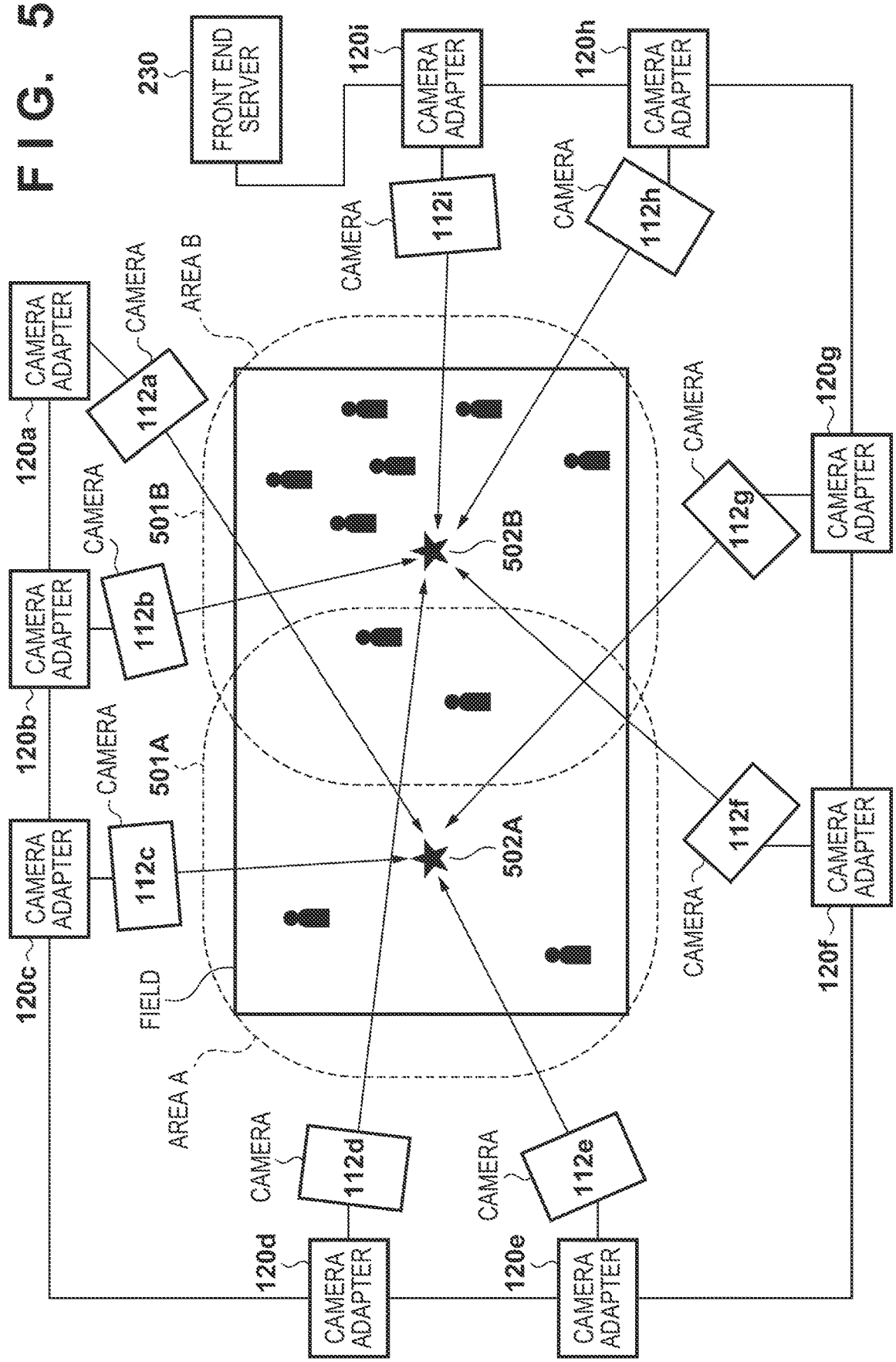
FIG. 5 is a view for explaining gaze point groups according to the first embodiment.

FIG. 5 shows an example when two gaze points 502, that is, gaze points 502A and 502B are set and nine cameras (112a to 112i) are placed. Four cameras (112a, 112c, 112e, and 112g) face the gaze point 502A, and belong to a gaze point group 501A. The remaining five cameras (112b, 112d, 112f, 112h, and 112i) face the gaze point 502B, and belong to a gaze point group 501B. Each of areas A and B indicated by broken lines represents an outline of a common capture range of the cameras belonging to each gaze point group. For example, data for generating a virtual viewpoint image of an object existing in area A are obtained from the four cameras (112a, 112c, 112e, and 112g) belonging to the gaze point group 501A. If the cameras 112 are grouped in accordance with the gaze points, a capture range for generating a virtual viewpoint image is common to the cameras of each gaze point group. Some representative cameras 112 may be selected from the plurality of cameras 112 belonging to each gaze point group to calculate foreground occupancies, and the above-described frame rate adjustment may be performed based on the calculation result for each gaze point group (the calculation being based on foreground occupancies of the representative cameras). This can reduce the calculation amount until the camera adapter control unit 710 determines appropriate adjustment.

In this case, the image processing system 100 may calculate the number of objects that can be captured in each gaze point group in step S402, and perform a frame rate adjustment based on the calculated number for each gaze point group. More specifically, the image processing system 100 sets a higher frame rate for a gaze point group having a larger number of objects that can be captured (or having a larger number of objections that are of interest). This allows the image processing system 100 to make higher (increase) the image quality of a virtual viewpoint image generated from images captured by cameras in the gaze point group including a larger number of the objects. In step S402, the image processing system 100 may determine a gaze point group including a specific object (for example, a ball or a specific person) or a gaze point close to the specific object, and perform a frame rate adjustment in accordance with the determination result. More specifically, the image processing system 100 sets a higher frame rate for a gaze point group including the specific object or a gaze point closer to the specific object. This allows the image processing system 100 to make higher the image quality of a virtual viewpoint image generated based on images captured in the gaze point group in which the object of interest is more likely to be captured.

As described above, in the first embodiment, a transmission data amount is nonuniformly distributed (i.e. assigned differently) to cameras or camera groups based on foreground occupancies, and frame rates are adjusted. While suppressing (or maintaining) the (total) transmission data amount to a predetermined amount, it is possible to generate a finer and higher-quality virtual viewpoint image of a location/position where the foreground occupancy is higher, that is, a location where more objects of interest (for example, players and the like) receiving attention are included in the image. Thus, it is possible to obtain a finer and higher-quality virtual viewpoint image that is generated based on the images captured by camera(s) in the gaze point group in which (more) objects receiving the attention can be captured. When frame rates for foreground occupancies are not set to have a predetermined fixed proportional relationship, and are calculated based on the tallying result of all the cameras in the image processing system, it is possible to achieve image quality obtained by making a full use of capacity of the image computing server without leaving any spare transmission data amount. Note that the reason why the frame rates are calculated based on, not the data amounts of the foreground images, but the occupancies is that even if the resolution is different among the cameras, it is possible to compare amounts of the foreground images without having to take into account of the different resolutions.

Determination of the frame rates has been explained as adjustment of the transmission data amount and the imaging parameters. However, the present invention is not limited to this. For example, a distribution of the data amount transmitted from the camera adapters 120 to the image computing server 200 may be adjusted by adjusting the resolutions and transmission compression rates based on the foreground occupancies. If, for example, there is a camera that obtains no foreground image, for example players are concentrated in a portion of a field and only a background image is captured in a field event, transmission from that camera need not be performed. A plurality of the various adjustment operations may also be combined. The camera group is not limited to the gaze point group, and may be formed based on any measure/parameter related to where the cameras are pointed, for example by grouping cameras whose capture directions fall within a predetermined range among the plurality of cameras.

Second Embodiment

The second embodiment will be described with reference to FIGS. 6, 7, and 8. In the first embodiment, capture setting and/or transmission setting of each camera is determined based on the foreground occupancy determined from the captured image, thereby controlling, for example, the frame rate, resolution, and transmission compression rate. In the second embodiment, capture setting and/or transmission setting of each camera is determined based on sound data obtained from a microphone 111. That is, in the second embodiment, sound collection is performed at a plurality of locations in a capture space of a plurality of cameras, and (nonuniform) distribution of a transmission data amount to the plurality of cameras is determined based on a sound distribution in the capture space, obtained based on collected sound data. Note that the second embodiment will describe a case in which a plurality of gaze point groups (camera groups) exist. However, it is understood that the invention is not limited thereto as long as corresponding sound data can be collected for the captured image to adjust a corresponding camera or camera adaptor based thereon.

Figure 6:
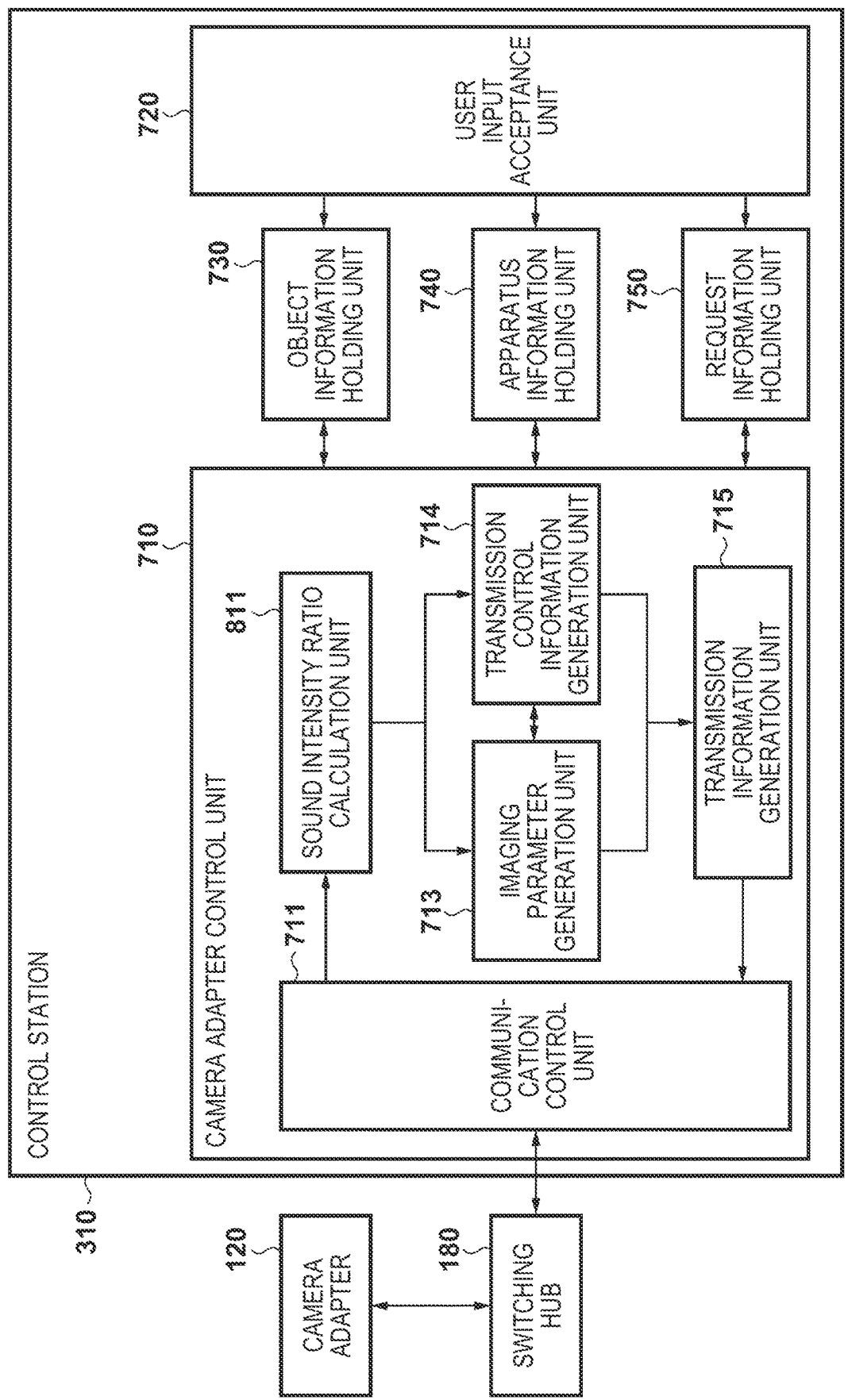
FIG. 6 is a block diagram showing an example of a functional arrangement of a control station according to the second embodiment.

FIG. 6 is a functional block diagram showing a control station 310 according to the second embodiment. FIG. 7 is a flowchart illustrating adjustment control of imaging parameters and transmission, that is performed by a camera adapter control unit 710 for a camera adapter 120 according to the second embodiment. Note that the same reference numerals and symbols as in the first embodiment denote functional blocks, processing steps, and the like having the same roles. FIG. 8 is a schematic view showing an image processing system 100 including two gaze point groups (502A and 502B), similarly to FIG. 5.

Figure 7:
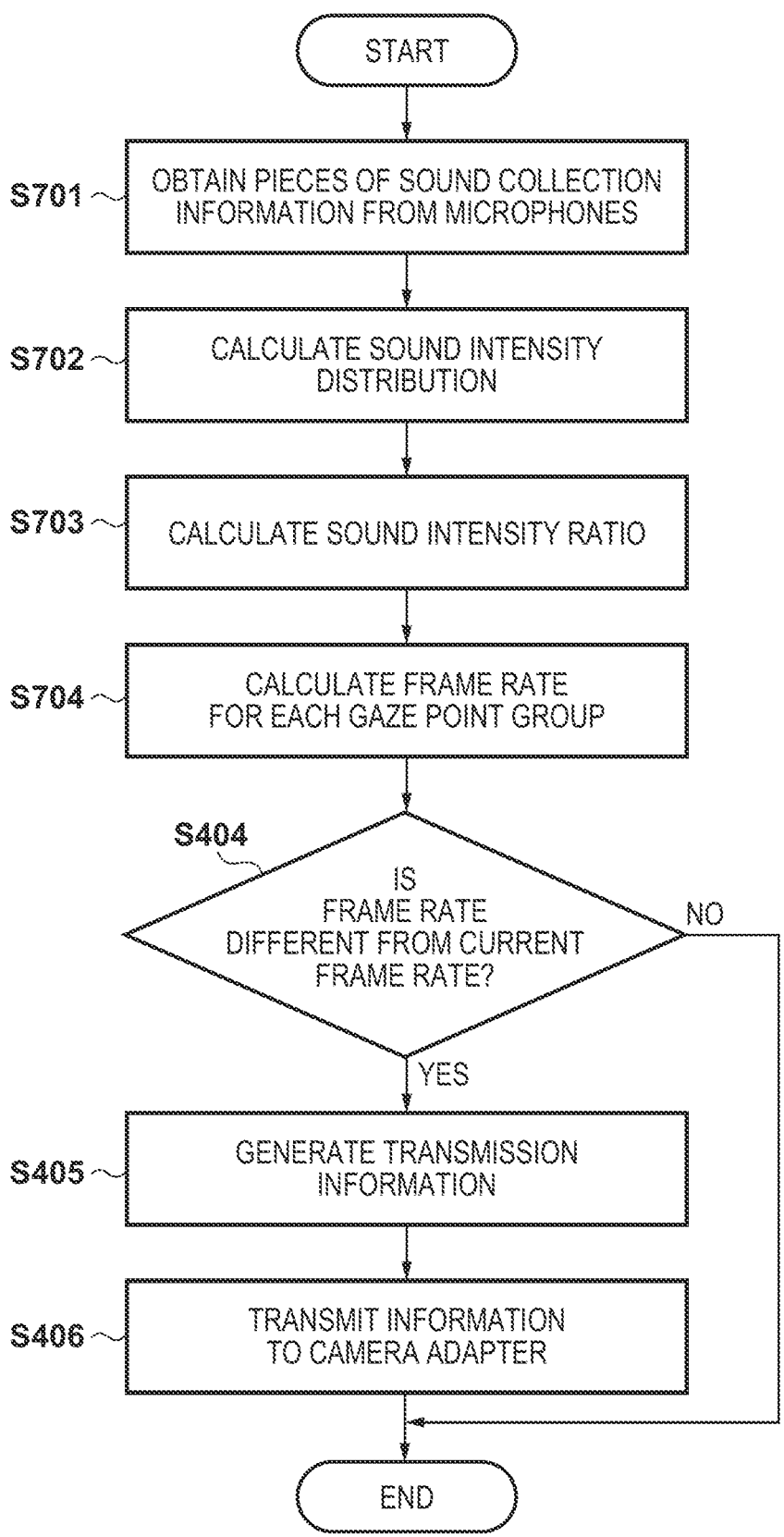
FIG. 7 is a flowchart illustrating frame rate adjustment processing according to the second embodiment.
Figure 8:
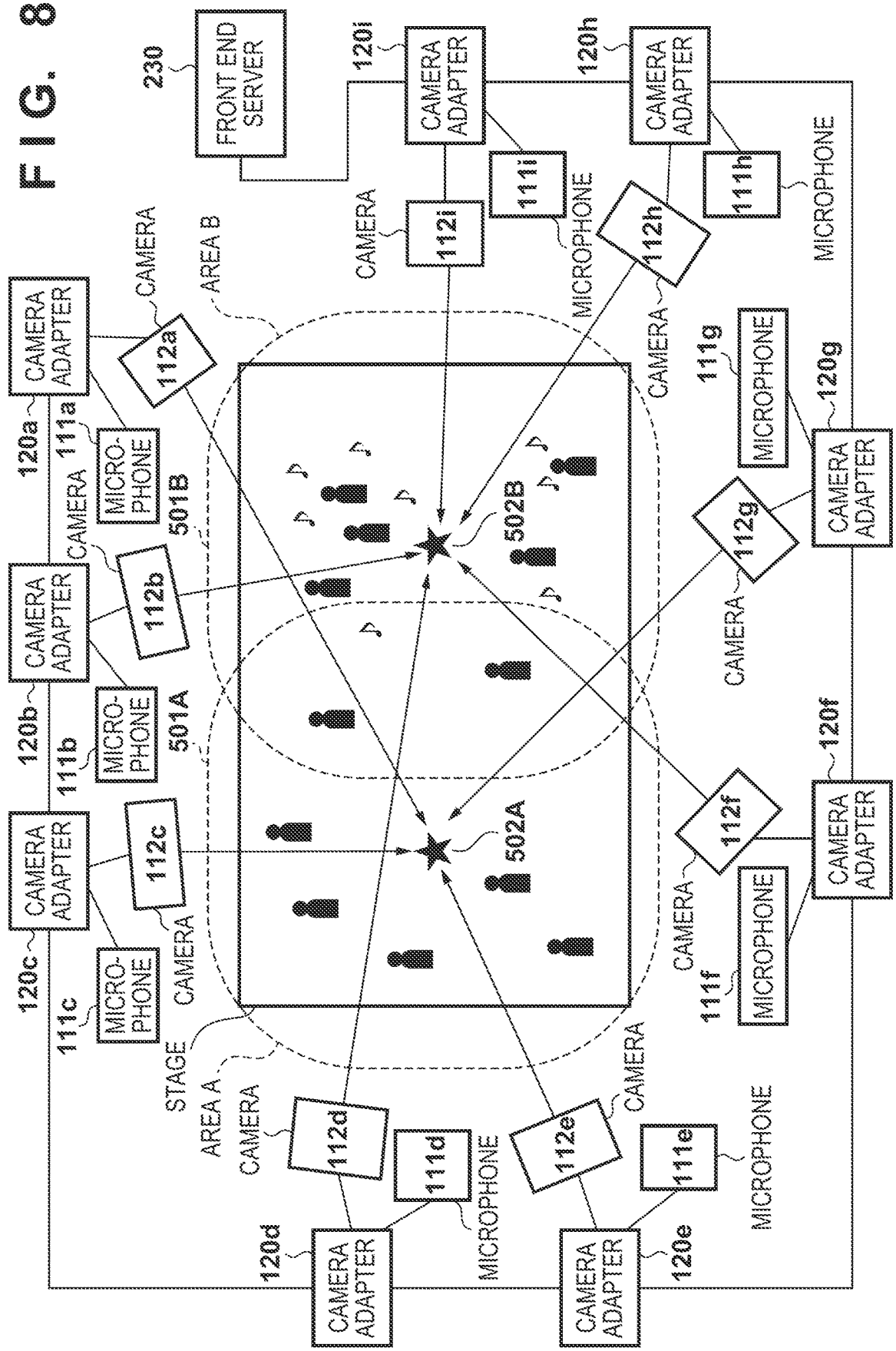
FIG. 8 is a view for explaining gaze point groups according to the second embodiment.

In the second embodiment, camera adapters 120a to 120i (FIG. 8) obtain pieces of information on (i.e. relating to) the intensities and directions of sounds collected by connected microphones 111a to 111i (FIG. 8), respectively (step S701 of FIG. 7). Note that frequency analysis may also be performed for the collected sounds and then the information on the sound intensity and direction of only a specific voice or instrument may be obtained.

A sound intensity ratio calculation unit 811 receives pieces of sound collection information from all the camera adapters 120a to 120i (FIG. 8) in the image processing system 100, performs combining processing, and calculates/determines a spatial sound intensity distribution around or near an object of interest to be captured (step S702). For example, for a spatial range on a stage or the like, the intensity of a sound generated at each location is three-dimensionally grasped/determined. More specifically, a sound intensity distribution is three-dimensionally grasped/detected/determined using, for example, a directional microphone or stereo microphone as the microphone 111. Next, the sound intensity ratio calculation unit 811 adds sound intensities generated in each of areas A and B shown in FIG. 8, and calculates a sound intensity ratio between the areas or regions included therein (step S703). Based on the sound intensity ratio between the areas, an imaging parameter generation unit 713 calculates a frame rate for each gaze point group (step S704). For example, a frame rate can be calculated using equation (1) above (A:B:C represents a sound intensity ratio). Subsequent processing (steps S404 to S406) is the same as in the first embodiment.

Note that the second embodiment has described a case in which the microphones 111 are connected to the plurality of camera adapters 120, respectively. A system in which a microphone 111 is positioned separated (away) from the camera adapter 120 may be formed/configured to three-dimensionally grasp/detect a sound intensity distribution in the capture space.

As described above, in the second embodiment, the frame rate, resolution, and transmission compression rate of each camera are adjusted based on the sound intensity distribution. Thus, in the second embodiment, even if no large difference in foreground occupancy is generated between the cameras but an object of interest is changed, it is possible to generate a finer virtual viewpoint image in a capture range of interest. For example, this embodiment is effective when, in a play, the image quality is to be increased by placing more weight/priority on a portion around an actor who is speaking (determining the frame rate, resolution, and transmission compression rate so that a transmission data amount becomes large) while many actors in the foreground are on a stage. Alternatively, this embodiment is effective when, in an orchestra, the image quality is to be increased by placing more weight on a main player of a performance while many players in the foreground always, fixedly exist. According to an embodiment, the second embodiment described herein may include the control station 310 of the first embodiment (which includes the Occupancy tally unit 712 for making a determination based on the foreground occupancies) with additional features included therein to enable the sound distribution based determination. In such an embodiment, the determination results based on both (or only one) determination variable(s) may be taken into account when controlling the camera or the camera adapter. It is also understood that according to an embodiment, an audio quality related parameter, such as a bitrate or audio data transmission compression rate, for the sound collected at the microphone 111 near the object of interest may be adjusted based on the determined/detected sound intensity distribution.

Third Embodiment

Figure 9:
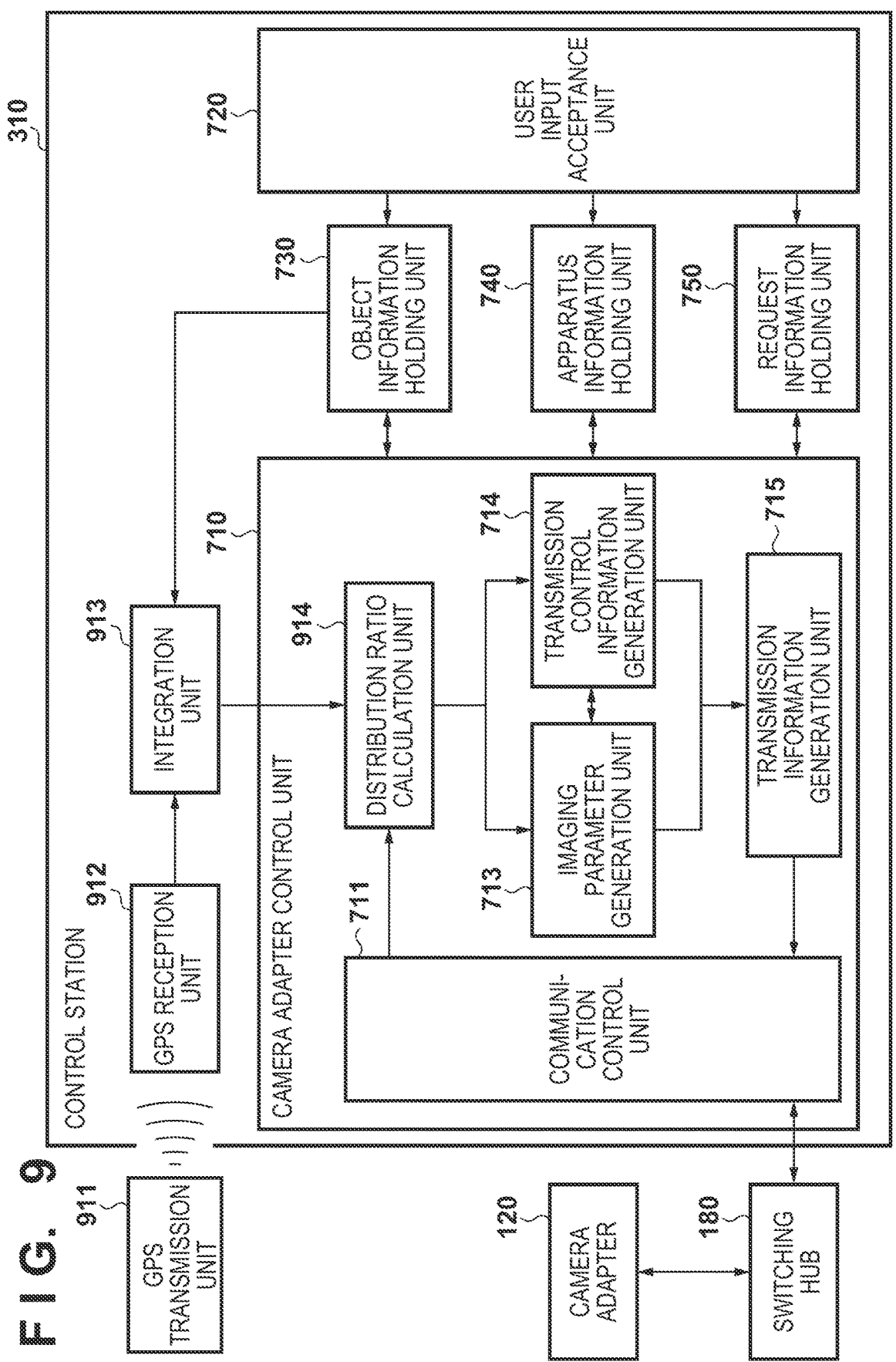
FIG. 9 is a block diagram showing an example of a functional arrangement of a control station according to the third embodiment.

The third embodiment will be described with reference to FIGS. 9 and 10. In the third embodiment, (nonuniform) distribution of a transmission data amount to a plurality of cameras is determined based on external sensor data based on an external sensor 114 such as pieces of position information indicating spatial positions of objects, and the capture setting and/or transmission setting of each camera is determined. In the third embodiment, a case in which a plurality of gaze point groups exist, similarly to the second embodiment, will also be explained. However, it is understood that the invention is not limited thereto as long as corresponding external sensor data can be collected for the captured image to adjust a corresponding camera or camera adaptor based thereon. FIG. 9 is a functional block diagram showing a control station 310 according to the third embodiment. FIG. 10 is a flowchart illustrating adjustment control of imaging parameters and transmission, that is performed by the control station 310 for a camera adapter 120 according to the third embodiment. Note that the same reference numerals and symbols as in the first and second embodiments denote functional blocks, sequences, and the like having the same roles.

In the third embodiment, each object of interest (for example, a player, a coach, or a ball) is provided with a GPS transmission unit 911. A GPS reception unit 912 receives pieces of position information of the objects of interest from the GPS transmission units 911 (step S901). An integration unit 913 integrates the pieces of position information of all the objects received by the GPS reception unit 912 and capture space information (for example, field space information or a coordinate in the capture space) obtained from an object information holding unit 730, and grasps/determines the positions of the objects such as the players on the field (step S902). Next, a distribution ratio calculation unit 914 counts the number of objects for each of the areas of the gaze point groups based on the positions grasped/determined in step S902, and calculates the ratio between the numbers of objects in the areas (step S903), e.g. a proportion of the total number of objects for each area. Based on the object distribution ratio between the areas, an imaging parameter generation unit 713 calculates a frame rate for each gaze point group (step S904). For example, a frame rate can be calculated using equation (1) (A:B:C represents the ratio among the numbers of objects). Subsequent processing (steps S404 to S406) is the same as in the first embodiment.

As described above, by adjusting the resolution and transmission in addition to the frame rate of each camera using GPS based on the object distribution ratio (i.e. the ration between the number of objects in the areas), it becomes unnecessary to calculate a foreground occupancy, and it is possible to more directly grasp determine the distribution of objects of interest. For example, even if a camera and a plurality of objects are accidentally, linearly arranged and many objects exist in a capture range but the objects overlap each other when viewed from a camera and thus a low value is calculated as a foreground occupancy, it is possible to accurately grasp/determine the distribution of the objects. Furthermore, it is possible to grasp/determine the positions of a specific player and the ball among the objects using individual identification of the GPS without having to individually identify based on an image. It is easy to adjust imaging parameters and transmission by placing more weight/priority on an area including these objects of interest. It is understood that according to an embodiment, the third embodiment described herein may be the control station 310 of the first embodiment (which includes the Occupancy tally unit 712 for making a determination based on the foreground occupancies) or of the second embodiment (which includes the Sound intensity ratio calculation unit 811 for making a determination based on the sound intensity distribution) with additional features included therein to enable the external sensor data (e.g. GPS data) based determination. In such an embodiment, the determination results based on all three, both or only one determination variable(s) may be taken into account when controlling the camera or the camera adapter.

The first to third embodiments have described the arrangement of grasping/determining the distribution of objects of interest using the foreground occupancies, sound intensities, and GPS, and controlling capture setting and/or transmission setting of each camera (each camera group) based thereon. Alternatively, a dynamic change amount generated on an image obtained by the camera 112 may be detected from the image, and more weight/priority may be placed on an area where the change amount is large, for example an area where a player moves significantly/violently, thereby adjusting the capture setting and/or transmission setting based thereon. An infrared camera or another temperature detection sensor may be used as the external sensor 114 connected to the camera adapter to detect heat generated by an object and grasp/determine a distribution of heat/infrared signature of the object to be captured, thereby controlling the capture setting and/or transmission setting based on the heat/infrared signature distribution.

Furthermore, instead of determining the weight/priority based on an automatic detection result as described above, distribution of a transmission data amount to the respective cameras (camera groups) may be determined in accordance with a request from the user to control the capture setting and/or transmission setting. For example, if the user selects a location where a finer virtual viewpoint image is requested in real time during capturing, more transmission data amount is allocated/assigned to a camera (camera group) that captures the selected location, thereby adjusting the capture setting and transmission setting. Note that the user is, for example, a user who operates the image processing system, a user who attempts to generate a virtual viewpoint image, or a user who views the generated virtual viewpoint image.

A change in weight of (priority assigned to) each area with time may be programmed and input to the control station 310, thereby performing the above-described adjustment in accordance with it. This can be effective in a case in which motions of objects can be determined or predicted in advance, such as a play, figure skating, or synchronized swimming. Furthermore, the priority levels of the camera groups may be determined in advance, and the transmission data amount of each camera may be determined so that the transmission data amount of a camera belonging to a camera group with a higher priority level is larger than that of a camera belonging to a camera group with a lower priority level. More specifically, distribution of a data amount to the camera groups can be determined by the method described in the first embodiment (equation (1)) using the ratio of the priority levels of the respective camera groups.

Some of the above-described weight/priority adjustment methods (the methods of adjusting the transmission data amounts of the areas) may be combined. In, for example, a sport event, the method may be switched or modified in accordance with a time schedule. For example, an adjustment may be performed based on the sound intensities in an opening ceremony when there are more sounds of interest and based on the foreground occupancies during the competition/match when there may be more visible change in the objects of interest. Alternatively, some automatic object detection methods may be used at the same time.

Instead of the above-described grouping based on the gaze points, the above-described adjustments may be performed for each camera group formed by another grouping rule. For example, if it is possible to determine, in advance or immediately, the direction of a virtual viewpoint to be generated, cameras that obtain images from the direction of the viewpoint may be grouped, and the adjustment may be performed to place more weight/priority on imaging parameters and transmission accordingly. Alternatively, in consideration of solar radiation or illumination conditions, cameras in a follow light or backlight state may be grouped together. If the frequency at which raindrops hit a camera lens is different among the placement locations of cameras in accordance with the intensity of rain, cameras may be grouped in accordance with the frequencies of the raindrops hitting the camera lens, and a frame rate may be increased for the higher frequency, thereby making it easy to remove image noise from raindrops.

During capturing, the grouping rule may be switched/adjusted. For example, cameras may be normally grouped based on gaze points, and when a request is issued, the grouping rule may be switched to the above-described one based on the direction of the virtual viewpoint. By switching to the above-described grouping rule based on solar radiation to the grouping rule based on rain in accordance with a change in weather, it is possible to apply an optimum adjustment method whilst taking into account of the weather.

In each of the above embodiments, the control station 310 collectively executes processes from the processing of grasping/determining the distribution of the objects to the capture setting/transmission setting of each camera or camera group. However, the present invention is not limited to this. For example, some or all of the processes may be performed by one of the camera adapter 120, the front end server 230, the database 250, and the back end server 270.

According to the above-described embodiments, in the image processing system 100 including the plurality of cameras 112, it is possible to perform capture control to obtain a virtual viewpoint image of improved image quality for an arbitrary (or variable) capture range while making a full use of the image processing capacity of the system.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a '(non-transitory) computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

STATEMENTS: The following statements form part of the description. The claims follow these statements and are labelled as such.

1. An image processing system for generating a virtual viewpoint image comprising: determination unit configured to determine a region to be prioritized out of the first region that is captured by a first capture apparatus and the second region that is captured by a second capture apparatus and is different from the first region; and control unit configured to perform, if it is determined to prioritize the first region, control for making image quality of an image captured by the first capture apparatus higher than image quality of an image captured by the second capture apparatus.

2. The system according to statement 1, wherein if a ratio of a foreground region corresponding to an object as a moving body in the image captured by the first capture apparatus is higher than that in the image captured by the second capture apparatus, the determination unit determines to prioritize the first region.

3. The system according to statement 1, wherein the determination unit determines a region to be prioritized among the first region and the second region based on position information of an object or sounds in the first region and the second region.

4. The system according to statement 1, wherein if it is determined to prioritize the first region, the control unit performs control for making a frame rate at which the first capture apparatus performs capturing higher than a frame rate at which the second capture apparatus performs capturing.

5. The system according to statement 1, wherein if it is determined to prioritize the first region, the control unit performs control for making a resolution or a data amount of the image captured by the first capture apparatus higher or larger than a resolution or a data amount of the image captured by the second capture apparatus.

6. An image processing system including: a plurality of cameras configured to capture an object from a plurality of directions, and a generation apparatus configured to generate a virtual viewpoint image from images captured by the plurality of cameras, the system comprising: determination unit configured to determine a transmission data amount of each camera by nonuniformly distributing, to the plurality of cameras, a data amount that can be transmitted from the plurality of cameras to the generation apparatus; and control unit configured to control capture setting and/or transmission setting of each of the plurality of cameras based on the transmission data amount determined by the determination unit.

7. The system according to statement 6, wherein the determination unit divides the plurality of cameras into a plurality of camera groups each including at least one camera, and determines the transmission data amount for each camera group.

8. The system according to statement 6, wherein the camera group is formed by cameras having a common gaze point among the plurality of cameras.

9. The system according to any one of statements 6 to 8, wherein the control unit controls capture frame rates of the plurality of cameras.

10. The system according to any one of statements 6 to 9, wherein the control unit controls capture resolutions of the plurality of cameras.

11. The system according to any one of statements 6 to 10, wherein the control unit controls transmission compression rates of images from the plurality of cameras to the generation apparatus.

12. The system according to any one of statements 6 to 11, wherein the control unit stops transmission of images from some of the plurality of cameras to the generation apparatus.

13. The system according to any one of statements 7 to 12, wherein the control unit notifies only a camera, among the plurality of cameras, in which a change in the capture setting and/or transmission setting has occurred, of the change.

14. The system according to statement 6, wherein the determination unit determines the transmission data amount of each of the plurality of cameras based on occupancies of foreground images as object regions in the images captured by the plurality of cameras.

15. The system according to statement 6, wherein the determination unit determines the transmission data amount of each of the plurality of cameras based on a sound distribution in a capture space of the plurality of cameras, obtained based on sound data collected at a plurality of locations in the capture space.

16. The system according to statement 6, wherein the determination unit determines the transmission data amount of each of the plurality of cameras based on position information of the object, a motion of the object detected from the images captured by the plurality of cameras, heat generated from the object, or a request from a user.

17. The system according to statement 7, wherein the data amount transmitted from the plurality of cameras to the generation apparatus is set not to be larger than a maximum data amount processable by the generation apparatus.

18. The system according to statement 7, wherein the data amount transmitted from the plurality of cameras to the generation apparatus is set not to be larger than a maximum data amount processable by the generation apparatus and near the maximum data amount.

19. A control method for an image processing system for generating a virtual viewpoint image based on an image captured by at least one of a plurality of capture apparatuses including a first capture apparatus for capturing a first region and a second capture apparatus for capturing a second region different from the first region, the method comprising: determining a region to be prioritized out of the first region and the second region; and performing, if it is determined to prioritize the first region, control for making image quality of an image captured by the first capture apparatus higher than image quality of an image captured by the second capture apparatus.

20. A program for causing a computer to execute steps of a control method according to statement 19.

This application claims the benefit of Japanese Patent Application No. 2017-095842, filed May 12, 2017, which is hereby incorporated by reference herein in its entirety.

What is claimed is:

1. An image processing apparatus comprising:
one or more memories storing instructions; and
one or more processors configured to execute the instructions to:
obtain a ratio of an area of a moving object in images captured by a first image capture apparatus and a second image capture apparatus which are included in a plurality of image capture apparatuses used for generating a virtual viewpoint image; and
control, based on that a ratio of an area of a moving object in a first image captured by the first image capture apparatus is larger than a ratio of an area of a moving object in a second image captured by the second image capture apparatus, at least one of the first image capture apparatus and the second image capture apparatus so that an image quality of an image to be captured by the first image capture apparatus is higher than an image quality of an image to be captured by the second image capture apparatus.

2. The apparatus according to claim 1, wherein the at least one of the first image capture apparatus and the second image capture apparatus is controlled to adjust a frame rate at which the at least one of the first image capture apparatus and the second image capture apparatus captures an image.

3. The apparatus according to claim 1, wherein the at least one of the first image capture apparatus and the second image capture apparatus is controlled to adjust a resolution or a data amount of an image to be captured by the at least one of the first image capture apparatus and the second image capture apparatus.

4. The apparatus according to claim 1, wherein the one or more processors is configured to further execute the instructions to:
determine a region of interest in an image capturing region captured by the plurality of image capture apparatuses, and
control at least one of image capture apparatuses among the plurality of image capture apparatuses, which capture the region of interest in the image capturing region, to capture an image at an adjusted image quality based on the determined region of interest in the image capturing region.

5. The apparatus according to claim 4, wherein the region of interest in the image capturing region is determined based on a ratio of an area of a moving object in each of images captured by the plurality of image capture apparatuses, position information of a moving object in the image capturing region, a source of a sound in the image capturing region, or a collector of a sound in the image capturing region.

6. An image processing system comprising:
a plurality of image capture apparatuses configured to capture a plurality of images;
a generation apparatus configured to generate a virtual viewpoint image based on the captured plurality of images; and
a control apparatus comprising:
one or more memories storing instructions; and
one or more processors configured to execute the instructions to:
determine a transmission data amount for an image capture apparatus by assigning, to the plurality of image capture apparatuses, proportions of a total transmission data amount that can be transmitted from the plurality of image capture apparatuses to the generation apparatus; and
control an image capturing parameter and/or a transmission parameter of the image capture apparatus based on the determined transmission data amount,
wherein a transmission compression rate of a captured image being transmitted from the image capture apparatus to the generation apparatus is controlled as the transmission parameter of the image capture apparatus, and
wherein, based on that a first ratio of an area of a moving object in a first image captured by a first image capture apparatus among the plurality of image capture apparatuses is larger than a second ratio of an area of a moving object in a second image captured by a second image capture apparatus among the plurality of image capture apparatuses, at least one of the first image capture apparatus and the second image capture apparatus is controlled so that an image quality of an image to be captured by the first image capture apparatus is higher than an image quality of an image to be captured by the second image capture apparatus.

7. The system according to claim 6, wherein the transmission data amount is determined for each group of the plurality of groups which include at least one image capture apparatus.

8. The system according to claim 6, wherein at least one of an image capturing frame rate of the image capture apparatus and an image capturing resolution of the image capture apparatus is controlled as the image capturing parameter of the image capture apparatus.

9. The system according to claim 6, wherein the transmission of the captured images from some of the plurality of image capture apparatuses to the generation apparatus is stopped.

10. The system according to claim 6, wherein the one or more processors further execute the instructions to generate control data for controlling an image capturing parameter and/or a transmission parameter of the image capture apparatus, and the control data is transmitted only to the image capture apparatus whose image capturing parameter and/or transmission parameter is to be changed.

11. The system according to claim 6, wherein the transmission data amount of the image capture apparatus is determined based on a ratio of an area of a moving object in each of the captured plurality of images.

12. The system according to claim 6, wherein the transmission data amount of the image capture apparatus is determined based on a sound intensity distribution in an image capturing space which the plurality of image capture apparatuses capture, wherein the sound intensity distribution is obtained based on sound data collected at a plurality of locations in the image capturing space.

13. The system according to claim 6, wherein the transmission data amount of the image capture apparatus is determined based on position information of a moving object, a motion of the object detected in a captured image, heat generated from the object, or a request from a user.

14. The system according to claim 6, wherein the total data amount that can be transmitted from the plurality of image capture apparatuses to the generation apparatus is set not to be larger than a maximum data amount processable by the generation apparatus.

15. The system according to claim 6, wherein the total data amount that can be transmitted from the plurality of image capture apparatuses to the generation apparatus is set not to be larger than a maximum data amount processable by the generation apparatus and not to be more than a threshold less than the maximum processable data amount.

16. A method of controlling an image processing apparatus, the method comprising:
obtaining a ratio of an area of a moving object in images captured by a first image capture apparatus and a second image capture apparatus which are included in a plurality of image capture apparatuses used for generating a virtual viewpoint image; and
controlling, based on that a ratio of an area of a moving object in a first image captured by the first image capture apparatus is larger than a ratio of an area of a moving object in a second image captured by the second image capture apparatus, at least one of the first image capture apparatus and the second image capture apparatus so that an image quality of an image to be captured by the first image capture apparatus is higher than an image quality of an image to be captured by the second image capture apparatus.

17. A non-transitory computer readable storage medium storing a computer program that, when executed by an image processing apparatus, causes the image processing apparatus to perform a method comprising:
obtaining a ratio of an area of a moving object in images captured by a first image capture apparatus and a second image capture apparatus which are included in a plurality of image capture apparatuses used for generating a virtual viewpoint image; and
controlling, based on that a ratio of an area of a moving object in a first image captured by the first image capture apparatus is larger than a ratio of an area of a moving object in a second image captured by the second image capture apparatus, at least one of the first image capture apparatus and the second image capture apparatus so that an image quality of an image to be captured by the first image capture apparatus is higher than an image quality of an image to be captured by the second image capture apparatus.

18. An image processing apparatus comprising:
one or more memories storing instructions; and
one or more processors configured to execute the instructions to:
obtain position information of a moving object in an image capturing region captured by a plurality of image capture apparatuses used for generating a virtual viewpoint image; and
control, based on that a number of a moving object in a first region of the image capturing region is larger than a number of a moving object in a second region of the image capturing region, at least one of a first image capture apparatus capturing the first region and a second image capture apparatus capturing the second region so that an image quality of an image to be captured by the first image capture apparatus is higher than an image quality of an image to be captured by the second image capture apparatus.

19. The apparatus according to claim 18, wherein the at least one of the first image capture apparatus and the second image capture apparatus is controlled to adjust a frame rate at which the at least one of the first image capture apparatus and the second image capture apparatus captures an image.

20. The apparatus according to claim 18, wherein the at least one of the first image capture apparatus and the second image capture apparatus is controlled to adjust a resolution or a data amount of an image to be captured by the at least one of the first image capture apparatus and the second image capture apparatus.

* * * * *